US 9,635,425 B2

(12) United States Patent
Johnson

(10) Patent No.: US 9,635,425 B2
(45) Date of Patent: Apr. 25, 2017

(54) HANDHELD DISPLAY ZOOM FEATURE

(71) Applicant: THOMSON LICENSING, Issy de Moulineaux (FR)

(72) Inventor: Ronald Douglas Johnson, Westfield, IN (US)

(73) Assignee: Thomson Licensing, Issy les moulineaux (FR)

( * ) Notice: Subject to any disclaimer, the term of this patent is extended or adjusted under 35 U.S.C. 154(b) by 0 days.

(21) Appl. No.: 14/434,108

(22) PCT Filed: Nov. 9, 2012

(86) PCT No.: PCT/US2012/064385
§ 371 (c)(1),
(2) Date: Apr. 8, 2015

(87) PCT Pub. No.: WO2014/074111
PCT Pub. Date: May 15, 2014

(65) Prior Publication Data
US 2015/0256886 A1    Sep. 10, 2015

(51) Int. Cl.
*H04N 5/44*     (2011.01)
*H04N 21/4728*  (2011.01)
(Continued)

(52) U.S. Cl.
CPC ....... *H04N 21/4728* (2013.01); *G06T 3/4092* (2013.01); *H04N 5/44* (2013.01);
(Continued)

(58) Field of Classification Search
USPC ....... 348/561, 563, 567, 581, 706, 714, 715, 348/747, 838, 49, 140, 158, 208.6, 211.9,
(Continued)

(56) References Cited

U.S. PATENT DOCUMENTS 7,385,624 B2   6/2008 Takehara et al.
8,160,564 B1   4/2012 Gunasekara et al.
(Continued)

FOREIGN PATENT DOCUMENTS

EP   2359915   8/2011
EP   2501143   9/2012
(Continued)

OTHER PUBLICATIONS

Shafait_EtAl:"Evaluation_of_a_Vision_Based_2-Button_Remote_Control_for_interactive_Television"; Proceedings of the 11th International Workshop on Systems, Signals & Image Processing. Sep. 13-14, 2004.

*Primary Examiner* — Jefferey Harold
*Assistant Examiner* — Mustafizur Rahman
(74) *Attorney, Agent, or Firm* — Brian J. Dorini; Reitseng Lin

(57) ABSTRACT

A control device is used to select a portion on a first display, the control device having a second display, the first display displaying images frame by frame generated from first image data including at least one frame; determine a first portion in a frame in the first image data corresponding to the selected portion on the first display; generate second image data from the first image data corresponding to the first portion in a frame in the first image data; and provide the second image data to the control device for display as a second image on the second display, while leaving intact the image displayed on the first display. The generated second image data may be the first image data corresponding to the first portion in a frame in the first image data magnified by a magnification factor.

27 Claims, 7 Drawing Sheets

(51) Int. Cl.
*H04N 21/41* (2011.01)
*H04N 21/422* (2011.01)
*H04N 21/4363* (2011.01)
*G06T 3/40* (2006.01)

(52) U.S. Cl.
CPC ..... *H04N 21/4122* (2013.01); *H04N 21/4126* (2013.01); *H04N 21/4222* (2013.01); *H04N 21/42209* (2013.01); *H04N 21/43637* (2013.01)

(58) Field of Classification Search
USPC ............ 348/240.99, 240.2, 240.3, 347, 376; 345/168, 173, 169, 661, 698; 455/419, 455/420, 456.1; 715/735, 740, 800, 863
See application file for complete search history.

(56) References Cited

U.S. PATENT DOCUMENTS

| | | | |
|---|---|---|---|
| 2006/0052684 A1 | 3/2006 | Takahashi et al. | |
| 2006/0221237 A1 | 10/2006 | Min et al. | |
| 2008/0120647 A1 | 5/2008 | Shin | |
| 2008/0174551 A1 | 7/2008 | Ishibashi | |
| 2009/0228841 A1* | 9/2009 | Hildreth | G06F 3/0304 715/863 |
| 2010/0173678 A1 | 7/2010 | Kim et al. | |
| 2010/0269152 A1* | 10/2010 | Pahlavan | G06F 9/4445 726/3 |
| 2010/0299436 A1* | 11/2010 | Khalid | G06F 1/1643 709/226 |
| 2010/0315438 A1* | 12/2010 | Horodezky | G06F 3/0481 345/661 |
| 2011/0050576 A1* | 3/2011 | Forutanpour | G06F 3/04886 345/168 |
| 2011/0221664 A1* | 9/2011 | Chen | G06F 3/017 345/156 |
| 2011/0316888 A1* | 12/2011 | Sachs | G06F 1/1626 345/667 |
| 2012/0017236 A1 | 1/2012 | Stafford et al. | |
| 2012/0046071 A1* | 2/2012 | Brandis | G06F 1/1694 455/556.1 |
| 2012/0151370 A1* | 6/2012 | Kominac | G06F 17/30905 715/740 |
| 2012/0206565 A1* | 8/2012 | Villmer | H04N 1/00 348/36 |
| 2012/0262492 A1* | 10/2012 | Ohashi | G01C 21/3664 345/660 |
| 2012/0311487 A1* | 12/2012 | Staikos | G06F 3/048 715/800 |
| 2013/0018939 A1* | 1/2013 | Chawla | H04L 67/08 709/203 |
| 2013/0229334 A1* | 9/2013 | Kim | G06F 3/04895 345/156 |
| 2013/0290856 A1* | 10/2013 | Beveridge | G06F 3/1454 715/740 |
| 2014/0022461 A1* | 1/2014 | Kuo | H04N 5/4403 348/734 |

FOREIGN PATENT DOCUMENTS

| | | |
|---|---|---|
| JP | 2004317733 | 11/2004 |
| JP | 2008181199 | 8/2008 |
| JP | 2008298684 | 12/2008 |
| KR | 2010069435 | 6/2010 |

* cited by examiner

HANDHELD DISPLAY ZOOM FEATURE

This application is a National Stage Application and claims the benefit, under 35 U.S.C. §365 of International Application PCT/US2012/064385 filed Nov. 9, 2012 which was published in accordance with PCT Article 21(2) on May 15, 2014 in English.

FIELD OF THE INVENTION

The present invention generally relates to digital image display methods and video receiver (108).

BACKGROUND OF THE INVENTION

When viewing still or moving images displayed on the screen of a display device such as a television set, a user may wish to zoom-in on a selected portion of the screen. A zoom feature is common on digital video disk (DVD) players. In a typical implementation, the DVD zoom feature zooms-in on a portion of the screen by displaying a magnified version of that portion. This feature allows zooming-in on selected content but at the expense of removing or obscuring other content that had been displayed. Similarly, various well known computer operating systems have zoom or magnifying lens features but also remove from view some other portion of content from the screen.

SUMMARY OF THE INVENTION

Exemplary methods and apparatus are disclosed which entail using a control device to select a portion on a first display, the control device having a second display, the first display displaying images frame by frame generated from first image data including at least one frame; determine a first portion in a frame in the first image data corresponding to the selected portion on the first display; generate second image data from the first image data corresponding to the first portion in a frame in the first image data; and provide the second image data to the control device for display as a second image on the second display.

In one embodiment, selecting the portion on the first display includes receiving third image data from a camera of the control device, the third image data representing a portion of an image displayed on the first display, and determining the first portion in a frame in the first image data comprises searching the first image data for a portion that corresponds to the third image data.

In another embodiment, selecting the portion on the first display comprises receiving third image data from a camera of the control device, a first portion of the third image data representing an image of the first display, the first portion in a frame in the first image data is determined according to a relative position of the first portion of the third image data in the third image data and a size of the first portion of the third image data in the third image data. In a further embodiment, if a resolution of the first image data is A×B units and a resolution of the third image data is W×H units, determining the first portion in a frame in the first image data includes locating the first portion of the third image data in the third image data and determining a position (p, q) in the third image data representing a point, such as a center or one of the corners, of the first portion of the third image data in the third image data; and determining a corresponding point in the first portion in a frame in the first image data as (a, b), where in a=(A/W)*p and b=(B/H)*q. If the size of the first portion of the third image data includes a width of w units and a depth of h units, a width and a depth of the first portion in a frame in the first image data respectively as d units and e units can be determined as d=(A/W)*w and e=(B/H)*h.

In an exemplary embodiment, the generated second image data is the first image data corresponding to the first portion in a frame in the first image data magnified by a magnification factor. The magnification factor may be determined from w or h. For example, the magnification factor can be W/w or H/h. The magnification factor can be taken from a setting database as well, set up by a user.

The first image data can represent a still image or a video frame.

Exemplary embodiments of the invention thereby allow the second display to show a magnified version of the selected portion without loss of resolution while leaving intact the image displayed on the first display.

In view of the above, and as will be apparent from the detailed description, other embodiments and features are also possible and fall within the principles of the invention.

BRIEF DESCRIPTION OF THE DRAWINGS

Some embodiments of apparatus and/or methods in accordance with embodiments of the present invention are now described, by way of example only, and with reference to the accompanying figures in which.

DETAILED DESCRIPTION

Figure 1:
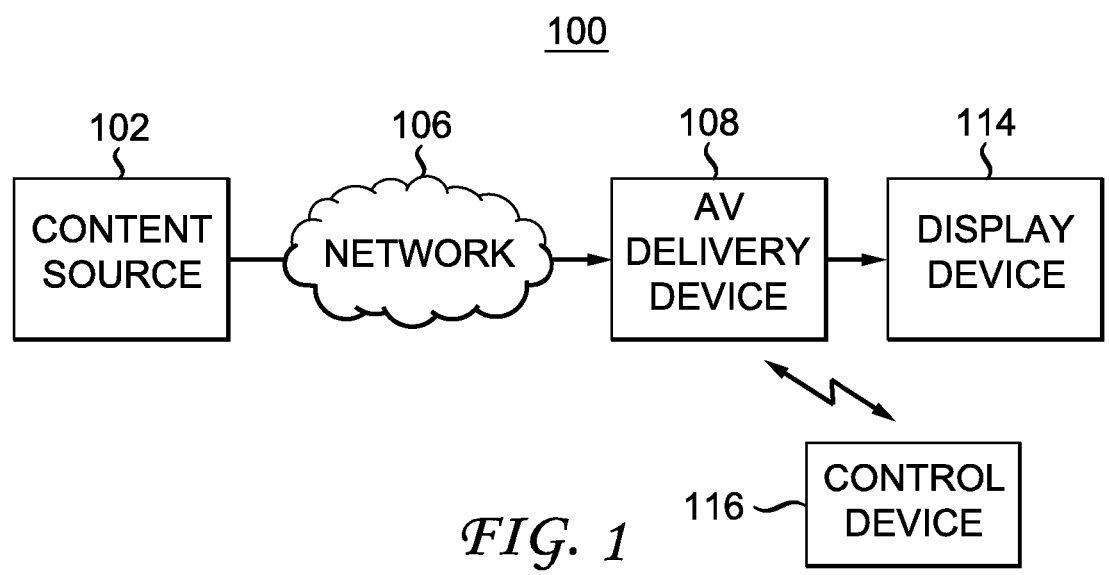
FIG. 1 is a block diagram of an illustrative environment in which one or more embodiments of the present invention may be used.

FIG. 1 is a block diagram of an illustrative environment 100 in which one or more embodiments of the invention may be used. In environment 100, audiovisual content originating from content source 102, such as a server, headend or the like, is delivered via delivery network 106 to a video receiver, illustrated as an AV delivery device (AVDD) 108 coupled to a display device 114. The AV delivery device 108 processes the content, as described in greater detail below, and provides the processed content to display device 114. Display device 114 may include, for example, one or more 2-D or 3-D standard definition (SD) or high definition (HD) displays, monitors or television receivers.

Delivery network 106 may include both wired and wireless elements and may include, for example, satellite link transmission from a national center to one or more regional or local centers. Delivery network 106 may also include local content delivery using local delivery systems such as over-the-air, satellite, or cable broadcast. Delivery network 106 may include optical fiber, Ethernet, phone line networks, and high-speed broadband Internet type communications systems, among others.

AV delivery device 108 can be implemented in a variety of ways and may include network-connected embodiments such as a set top box (STB) with or without a digital video recorder (DVR), gateway, modem, etc.; stand-alone embodiments, such as a DVD player, video server, etc.; or any combination thereof. Optionally, AV delivery device 108 may act as an entry point, or gateway, for a home network system that includes additional devices configured as either client or peer devices in the home network. Device 108 may also be incorporated into other systems or devices including an audiovisual device such as display device 114.

AV delivery device 108 is also interfaced, preferably wirelessly, to a control device 116 which is preferably handheld or portable. Control device 116 may be adapted to provide a user interface for AV delivery device 108 and/or display device 114. Control device 116 includes a display which is capable of displaying graphics and images, and preferably moving images, or video, as well. The control device 116 includes a camera (not shown), keys, and a controller (not shown), which may be a microprocessor, a processor, a microcontroller, for receiving user inputs, controlling the camera, and receiving captured images from the camera. The video displayed may include all or a portion of the video content that is delivered to display device 114 and the graphics may include icons, user interface widgets or the like. In an exemplary embodiment, control device 116 includes a touch screen, allowing both user input as well as the display of images and graphics. Of course, user input can also be provided via dedicated buttons with a screen performing a display-only function or any combination thereof.

Control device 116 may interface to AV delivery device 108 using any well known signal transmission system, such as infra-red (IR) or radio frequency (RF) communications and may conform to any suitable proprietary or standard protocol such as the Infra-red Data Association (IRDA) standard, Wi-Fi, Bluetooth, or the like. Control device 116 may be implemented, for example, using a commercially available device such as a tablet computer or smartphone configured with the appropriate software, or a customized device dedicated to the control of devices 108 and/or 114, among other possibilities. As mentioned above, the control device 116 includes a controller (not shown) for controlling operations of the control device 116. The operation of control device 116 will be described in further detail below.

Figure 2:
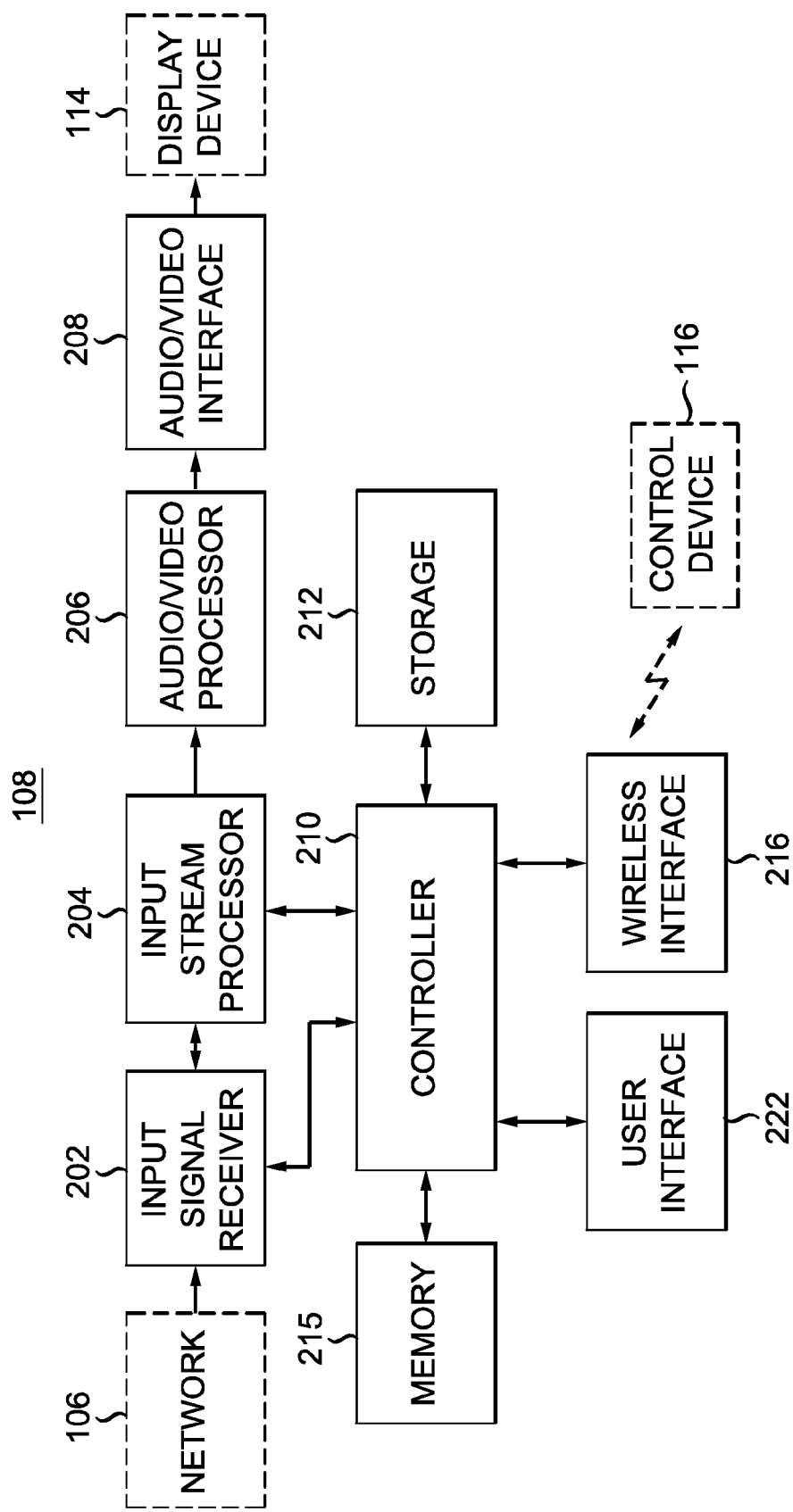
FIG. 2 is a block diagram of an exemplary embodiment of an audiovisual content delivery device in accordance with the present invention.

Turning now to FIG. 2, a block diagram of an embodiment of AV delivery device 108 is shown. In the interest of conciseness, not all components that may be necessary for complete operation of the device are shown, to the extent that they are well known. AV delivery device 108 is a processor-based system and includes one or more processors and associated memory as represented by controller 210 and memory 215. Controller 210 is representative of one, or more, stored-program control processors, which may or may not be dedicated to the functions described herein; i.e., controller 210 may also control other functions of AV delivery device 108. Moreover, if device 108 is part of a larger device or system, controller 210 may control other functions of this device or system as well.

Controller 210 manages the process of converting an input stream signal into a signal for storage or for display. Controller 210 also manages the retrieval and playback of stored content. Furthermore, controller 210 performs searching of content and the creation and adjustment of a grid display representing the content. Controller 210 may be implemented with a microprocessor or the like.

Controller 210 is interconnected with memory 215, which stores information and instruction code for controller 210. Memory 215 may be implemented, for example, with volatile or non-volatile memory, including RAM, SRAM, DRAM, ROM, programmable ROM (PROM), flash memory, electronically programmable ROM (EPROM), electronically erasable programmable ROM (EEPROM), or the like. Further, the implementation of memory 215 may include several possible embodiments, such as a single memory device or, alternatively, more than one memory circuit communicatively connected or coupled together to form a shared or common memory. Still further, memory 215 may be integrated with other circuitry, such as controller 210 and/or portions of bus communications circuitry, among other possibilities.

Memory 215 may also store a database of elements, such as graphic elements containing content. The database may be stored as a pattern of graphic elements. Alternatively, memory 215 may store the graphic elements in identified or grouped memory locations and use an access or location table to identify the memory locations for the various portions of information related to the graphic elements.

In addition to memory 215, controller 210 is interconnected, such as via a bus or other suitable arrangement, with other components of AV delivery device 108, including input signal receiver 202, input stream processor 204, audio/video processor 206, storage 212, wireless interface 216, and user interface 222.

In operation, a signal conveying audiovisual content is received by input signal receiver 202. Input signal receiver 202 may include any one or more of several known receiver circuits used for receiving, tuning, down converting, selecting, demodulating, and/or decoding signals received from any one or more of the several possible networks (106) by which content can be distributed, as discussed above. The desired input signal may be selected and captured by input signal receiver 202 under the control of controller 210, such as in accordance with user input or programming instructions, for example.

The decoded input signal is provided by input signal receiver 202 to input stream processor 204. Input stream processor 204 performs signal processing and provides the processed received signal to audio/video processor 206 for conversion from the received format, such as a compressed digital signal, to a format that can be provided to a display device (114) for presentation to the user. Audio/video processor 206 also performs any necessary processing for the storage and retrieval of audiovisual content in storage 212.

The converted signal from audio/video processor 206, either received by input signal receiver 202 or retrieved from storage 212, is provided to interface 208 for provision to a display device (114) of the type described above. Interface 208 may include an analog signal interface such as a red-green-blue (RGB) interface, and/or a digital interface such as a High-Definition Multimedia Interface (HDMI). A digital content includes at least one frame and the resolution is specified.

Storage 212 stores audiovisual content received by device 108 allowing for later retrieval and playback of the content under the control of controller 210 based on commands (e.g., navigation instructions such as fast-forward and rewind) received via wireless interface 216 from a control device (116) or from user interface 222. Storage 212 may include a hard disk drive, one or more large capacity integrated electronic memories, such as static RAM (SRAM) or dynamic RAM (DRAM), and/or an interchangeable optical disk storage system such as a compact disk (CD) drive or DVD drive.

User interface 222 may include a variety of user input and output devices (e.g., keys, buttons, displays, indicators) by which a user can interact with AV delivery device 108. In exemplary embodiments, user interface 222 can be eliminated with all user interaction taking place via a control device (116) interfaced to AV delivery device 108 via wireless interface 216.

Control device 116 can be used to express a variety of functions, such as zoom-in, zoom-out, play, stop, fast forward, rewind, program selection, etc. When implemented with a touch panel, control device 116 allows operation of AV delivery device 108 based on hand movements, or gestures, and actions translated through the touch panel into commands. Depending on the implementation of control device 116, other techniques such as voice recognition, for example, can also be used to enter commands.

In exemplary embodiments, control device 116 also includes at least one camera element. The camera element is preferably mounted on the side of the device opposite from the user input controls and display (e.g. touch screen) and may be used as described below.

Figure 3A:
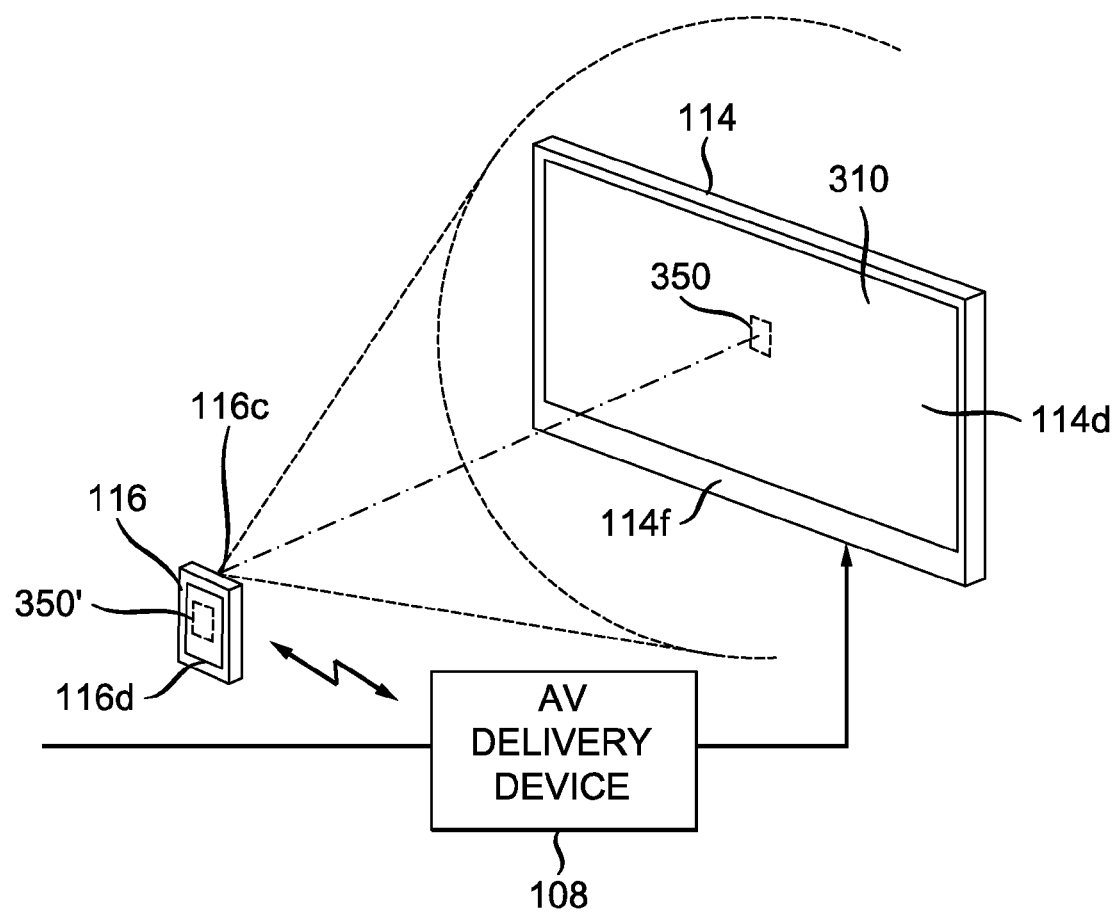
FIG. 3A is a schematic representation of the interaction between an audiovisual content delivery device, a display device and a control device in accordance with the principles of the present invention.

With reference to FIG. 3A, the interaction between AV delivery device 108, display device 114, and control device 116 will now be described. In operation, a user wishing to zoom in on an area 350 of an image 310 displayed on display device 114 would point the camera 116c of control device 116 toward that area and view the area 350 on the display 116d of control device 116. Preferably, the zoomed-in image displayed on control device 116 is updated in real-, or near real-time as the image 310 changes and/or as the user moves the control device and redirects camera 116c. Also preferably, the user is given the option to view and/or capture a still image of the area 350, such as by pressing a key on control device 116. The captured image is represented by a third image data, which preferably has the resolution of the display (the second display) of the control device 116. In addition, the aspect ratio and/or orientation of area 350 preferably conforms to that of display 116d.

As described in greater detail below, AV delivery device 108 uses the image captured represented by the third image data by camera 116c of control device 116 to locate the first portion in a frame within the source content (the first image data including at least one frame) corresponding to the area 350 in the image 310, which is generated from a frame in the first image data. A second image data is then generated from the first portion in a frame in the first image data, preferably at its native resolution, processed and sent to control device 116 for display on display 116d (the second display) as a second image. In operation, it would appear to a user as though camera 116c of control device 116 is zooming-in on the area of interest 350, but without the inaccuracies and loss of resolution that would occur if the image actually captured by the camera were to be digitally enlarged. Such loss of resolution would be particularly noticeable for example, where the source material is a high resolution photographic image. Consider, for example, that a 20 megapixel image would be displayed with a resolution of only 1 megapixel on a typical 720p television monitor, thereby losing a good amount of detail.

The above embodiment is suitable for the image source (the first image data) representing still images. The magnification factor for zooming can be found from a user setting database set up by the user. In an embodiment, if the resolution of the captured third image data is W×H pixels and the size of the first portion in a frame in the first image data is a×b pixels, the magnification factor is automatically generated as either W/a to fill the width of the second display 116d or H/b to fill the depth of the second display 116d. Although using "pixel" as the unit, other unit such as "block," for example "macroblock" can be used as well.

In an exemplary embodiment, control device 116 sends the captured third image data captured by camera 116c to AV delivery device 108, which uses the third image data to locate the first portion of the first image data corresponding to the area 350 by searching for all or a portion of the display 114d of display device 114 within the third image data and by using the relative location of display 114d within the third image data to derive the location of the first portion in a frame in the first image data. Preferably, the third image data captured by camera 116c includes the entire display 114d occupying a first portion of the third image data. The area of interest 350 can be a predefined size or a variable size. A location of the first portion in a frame in the first image data corresponding to the area 350, which can be represented by a location of a point in the first portion in a frame in the first image data, can be determined by a location of a corresponding point in the image of the display 114d of display device 114 occupying the first portion of the third image data. The two corresponding points can be the center or one of the corners of the first portion of the third image data and the first portion in a frame in the first image data, respectively. The image 310 is generated from a frame in the first image data. Since a position in the image 310 has a corresponding position in the corresponding frame in the first image data, the area of interest (AOI) 350 determines the first portion in a frame in the first image data. When searching for display 114d within the third image data, AV delivery device 108 can, for example, search for the frame 114f of display device 114, which surrounds and delineates display 114d. Any of a variety of well-known techniques for performing image searching can be used for this purpose. If the entire display 114d is not captured within the image, the zooming-in function may be disabled until the user re-positions camera 116c so that these conditions are met.

Based on the relative location of display 114d within the third image data captured by the camera 116c, AV delivery device 108 can determine the first portion in a frame in the first image data corresponds to area 350 within the image 310 in the first display 114d. Given the size of the display 114d in the third image data 350, the size of the first portion in a frame in the first image data (e.g., MPEG macroblocks) associated with area 350 can be readily determined and accessed. Using the first portion of the first image data corresponding to area 350, AV delivery device 108 can re-generate the first portion in a frame in the first image data as the second image data and provide the second image data to control device 116 for display as the second image by display 116d, shown thereon as area 350'. Area 350' can be magnified in response to a user command. When area 350' is altered, the control device can manually or automatically adjust the size of the image generated from the received second image data. If area 350' is displayed on display 116d at a fixed size (e.g., occupying the full screen of display 116d), magnification can be varied according to the size of display 114d in the third image data. For example, if the size of the area 350' has a size of R×S pixels and the size of the display 116d in the third image data is w×h pixels, the AV delivery head may automatically magnify the first portion in a frame in the first image data by a factor of R/w to fit the width of the area 350' or with a factor of S/h to fit the depth of the area 350'. This embodiment works well when the resolution of the first image data is the same as that of the second display 116*d*.

In an alternative, if the first portion in a frame in the first image data has a size of a×b pixels, the AV delivery device 108 may magnify the first portion in a frame in the first image data by a factor of R/a to fill the width of the area 350' or S/b to fill the depth of the area 350'. This embodiment works well when the resolution of the first image data is not the same as that of the second display 116*d*.

A user using the control device 116 can instruct the AV delivery device 108 to magnify the first portion in a frame in the first image data corresponding to AOI 350 automatically or with a specified magnification factor. When the user change the size of the area 350', the user may configure the control device 116 to change the magnification factor at the control device 116 without changing the magnification factor at the AV delivery device 108. In one embodiment, the user may also configure the control device 116 to send the updated size of the area 350' to the AV delivery device 108, so that the AV delivery head 108 may automatically change the magnification according to the updated size.

Figure 3B:
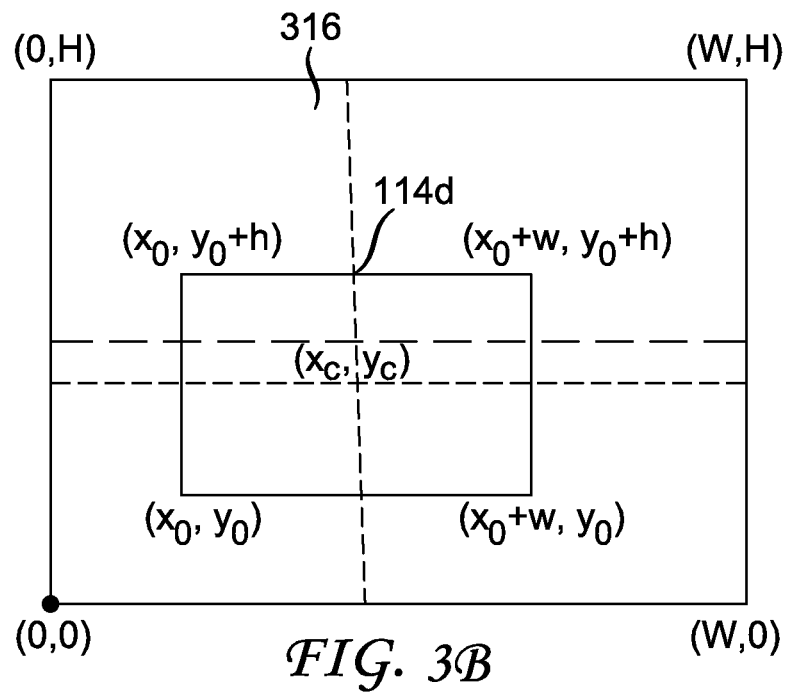
FIG. 3B is a schematic representation of an image captured by a camera of the control device showing the display device therein.
Figure 3C:
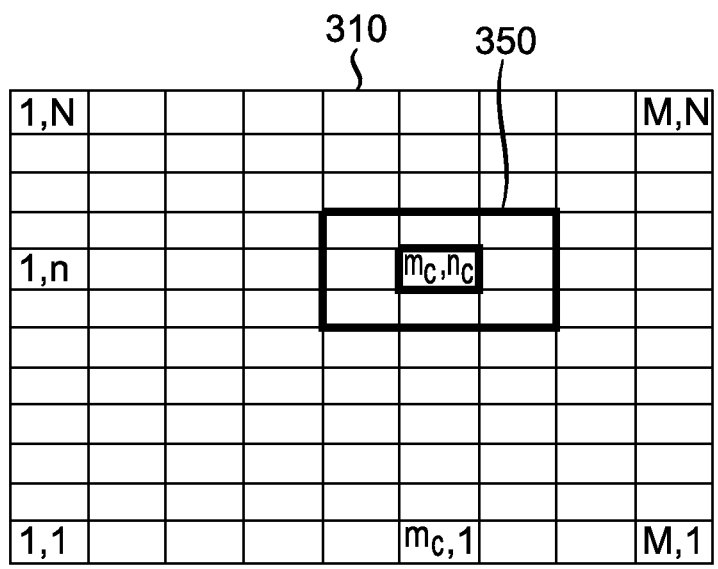
FIG. 3C is a schematic representation of an image displayed by the display device.

The determination of the first portion in a frame in the first image data corresponds to area of interest 350 will now be described with reference to FIGS. 3B and 3C. FIG. 3B provides a schematic representation of an image 316 generated from the third image data captured by camera 116*c* showing display device 114 therein. The portion of image 316 representing display 114*d* of display device 114 is designated 114*d'*. As depicted, the image 316 and image portion 114*d'* are rectangular, with widths of W and w pixels in the third image data, respectively, and heights of H and h pixels in the third image data, respectively. As pointed it previously, although 'pixel' is used as a unit, other units, such as 'block', for example "macroblock" can be used as well. The mage 316 can be thought of as a grid of points or pixels (x, y) in the third image data with its origin in the lower left corner for simplicity of illustration. Other locations can be selected as the origin as well, for example, any of the three other corners and the center of the third image data can be used as the origin. Image portion 114*d'* can be thought of as a rectangle with vertices at the points $(x_0, y_0)$, $(x_0+w, y_0)$, $(x_0+w, y_0+h)$ and $(x_0, y_0+h)$ with its center at $(x_C, y_C)$ in the third image data, where $x_C=x_0+w/2$ and $y_C=y_0+h/2$. These points can be determined by a suitable image searching technique, such as mentioned above.

As mentioned above, the first portion in a frame in the first image data corresponding to AOI 350 within image 310, which is generated from a frame in the first image data, can be determined based on the relative location of the image portion 114*d'* in the third image data 316. More specifically, the position of the center of the image portion 114*d'* in the third image data 316 can be mapped into a grid of image units, such as blocks, for example, MPEG macroblocks, which collectively form the first image data. Such a grid is depicted schematically in FIG. 3C, with the grid being M blocks wide and N blocks high in the first image data, with each block designated (m, n), starting with block (1, 1) in the lower left corner in the first image data.

As can be appreciated, the block $(m_C, n_C)$ corresponding to the center block of the first portion in a frame in the first image data corresponding to AOC 350 can be determined in accordance with the following expressions:

$$m_C = \text{ceil}[(M/W)*(W-x_C)], \quad (1a)$$

$$n_C = \text{ceil}[(N/H)*(H-y_C)]. \quad (1b)$$

With the block $(m_C, n_C)$ thus determined, the first portion in a frame in the first image data can be selected to be the block $(m_C, n_C)$, or a set of blocks which includes block $(m_C, n_C)$ and additional block surrounding block $(m_C, n_C)$. For example, as illustratively depicted in FIG. 3C, the first portion in a frame in the first image data corresponding to AOI 350 is comprised of block $(m_C, n_C)$ and the eight blocks immediately surrounding it. The number of blocks representing the first portion in a frame in the first image data can be predetermined or determined according to the size of the image portion 114*d'*. For example, the width of the first portion in a frame in the first image data is ceil [M*w/W] macroblocks and the depth of the AOI 350 is ceil [N*h/H]. With the size and the location of the first portion in a frame in the first image data thus determined, AV delivery device 108 can generate the corresponding second image data for display on area 350' as the second image on display 116*d*.

As discussed above, a user may inform the AV delivery device 108 the resolution (size) of the area 350' in display 116*d* of the control device 116 using, for example, the control device 116, and/or the control device 116 may automatically send the updated size to the AV delivery device 108 when the size of the area 350' has been changed. This way, the AV delivery device 108 may automatically zoom the AOI 350 to fit the width of the area 350' or the depth of the area 350' if the magnification factor is not available at the AV delivery device 108 or the AV delivery device 108 is instructed to zoom the first portion in a frame in the first image automatically. As used herein, the width of a display is longer than the depth of the display, even though the display can be positioned in either portrait or landscape orientation. A size or resolution of M×N units means that the width is M units and the depth is N units.

In this embodiment, the location of the portion in the third image data corresponding to the AOI 350 in the image 316 is in a symmetrically opposite quadrant to that of the image portion 114*d'* within the third image data displayed as image 316. For example, when the camera 116*c* is moving to the right, the first portion in a frame in the first image data corresponding to the AOI 350 is also moving to the right, but the image portion 114*d'* in the third image data is moving to the left.

In another embodiment, the location of the portion in the image corresponding to the AOI 350 in the image 316 coincides with the location of the image portion 114*d'* in the third image data displayed as image 316 and a user determines the location of the AOI 350 according to the location of the image portion 114*d'* in the third image data displayed as image 316. In this embodiment, the center block of the first portion in a frame in the first image data can be determined in accordance with the following expressions:

$$m_C = \text{ceil}[(M/W)*x_C], \quad (2a)$$

$$n_C = \text{ceil}[(N/H)*y_C]. \quad (2b)$$

It should be noted that although Eqs. (1a), (1b), (2a), and (2b) use 'block' as the unit, the principles of the invention are equally applicable if "pixel" is used as the unit. In that case, $(m_C, n_C)$ indicates the location of the center pixel in the first portion in a frame in the first image data.

In exemplary embodiments, once AV delivery device 108 has located the first portion in a frame in the first image data, it can cause display device 114 to display a graphic such as a rectangle, cross-hairs or other suitable shape, to indicate the corresponding area 350, thereby providing visual feedback to the user of where in image 310 camera 116*c* of control device 116 is pointed. Additionally, where area 350 is displayed on display 116d at a fixed size (e.g., full screen) the size of the graphic, such as a rectangle delineating area 350, can be varied as the magnification is varied.

In other exemplary embodiments, control device 116 need not have or use a camera element to select area of interest 350 on which the user wishes to zoom-in. Such an indication can be provided by displaying a graphic, such as a rectangle, cross-hairs or other suitable shape, on the screen of the display device 114 and/or on the screen of the control device itself, and allowing the user to move the graphic to select the area of interest 350. Movement of the graphic and/or selection of area of interest 350 can be effected such as by gestures, the pressing of soft or actual keys, voice commands, or other well known user interface techniques possible with control device 116.

In an exemplary embodiment, the third image data captured by camera 116c is 640×480 pixels. In typical use, the portion thereof representing display 114d may be, for example, 200×120 pixels, or about 8% of the captured image area. In an illustrative operational scenario, a user points camera 116c at display device 114 and sees the third image data captured thereby displayed, preferably live, on display 116d, with display 114d appearing generally at or near the center of display 116d of control device 116. For example, with reference to FIG. 3B, $(x_0, y_0)=(220, 180)$, W=640, H=480, w=200 and h=120. The user then instructs control device 116 to zoom-in, such as by an input command. Control device 116 then sends a third image data captured by camera 116c to AV delivery device 108 which searches through the third image data for that portion depicting display 114d occupying the first portion in the third image data, determines the first portion in a frame in the first image data according to the size and location of the first portion in the third image data, and then sends back to control device 116 a second image data generated from the first portion in a frame in the first image data representing a zoomed-in image of the area 350 of the image displayed on display 114d for display on display 116d as the second image. With reference to FIG. 3C, assuming, for example, that M=64 and N=48, and in accordance with Eqs. (1a) and (1b), $m_C=32$ and $n_C=24$.

When video is displayed on display 114d, AV delivery device 108 continues to send updated second image data, which may be zoomed-in version of the first portion in a different frame in the first image data corresponding to the area 350 in the video displayed on display 114d, to control device 116. As such, display device 116d displays a zoomed-in video of the area 350 of the video displayed on display 114d selected for magnification. If the user would like to look closely at a new area of interest on the left side of display 114d, they would point camera 116c to the left so as to point to the new area of interest. In a new image captured by camera 116c in this position, display 114d would be shifted to the right by some fraction (e.g., 25%) of its original width (e.g., 200 pixels) if Eqs. (1a) and (1b) are used to locate the first portion in a frame in the first image data. AV delivery device 108 processes the new image and determines that display 114d has moved, for example, 50 pixels to the right. Having determined that display 114d occupies an area of 200×120 pixels in the image, AV delivery device 108 now shifts the zoomed-in streaming video by 25% of the display size to the left if Eqs. (1a) and (1b) are used to locate the first portion in a frame in the first image data. In the same scenario, if Eqs. (2a) and (2b) are used to locate the first portion in a frame in the first image data AV delivery device 108 now shifts the zoomed-in streaming video by 25% of the display size to the right.

Figure 4:
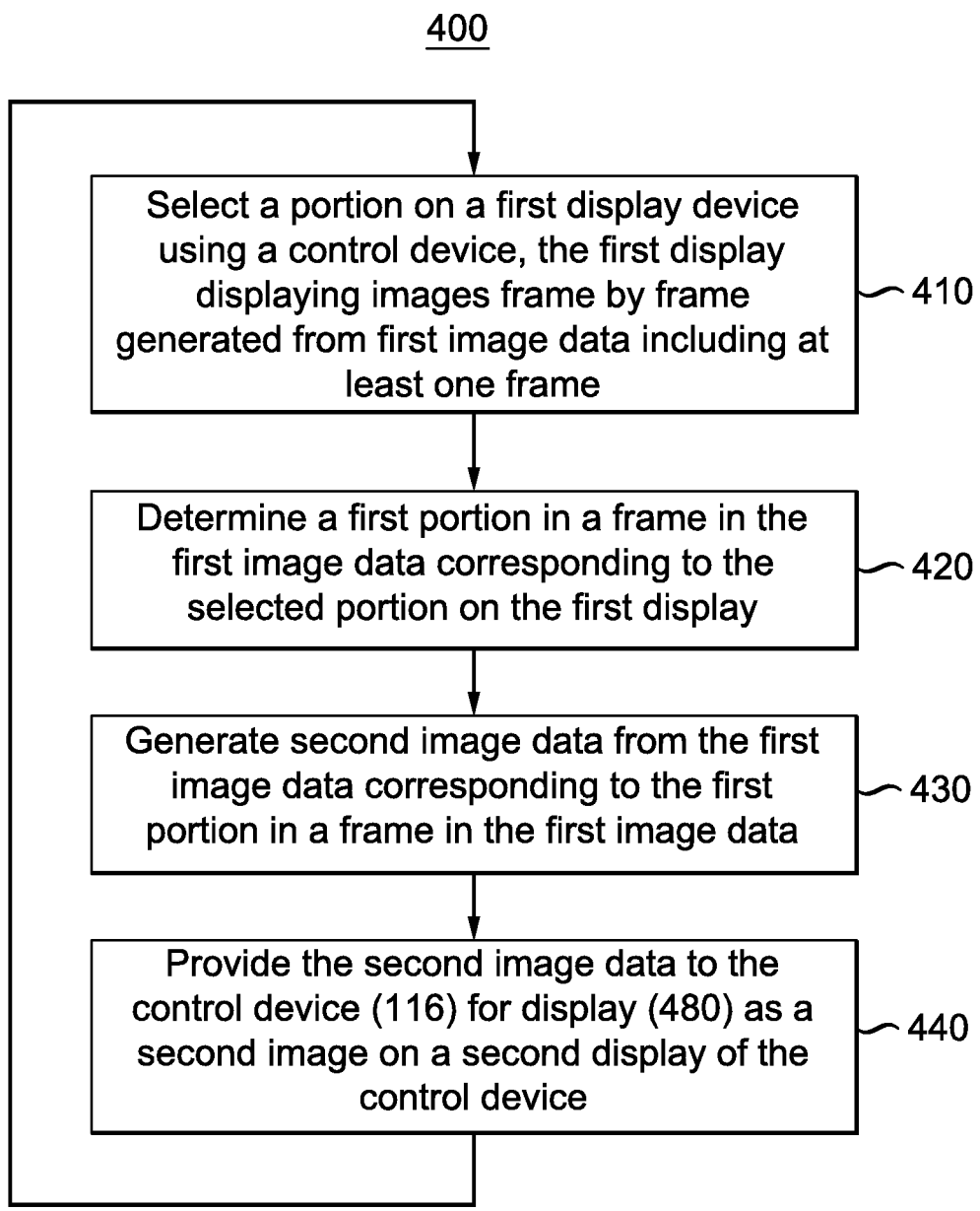
FIG. 4 is flowchart of an exemplary method in accordance with the principles of the present invention.

FIG. 4 shows a flow chart illustrating the operation of an exemplary embodiment of the present invention. In this example, for simplicity, the area 350' is assumed to be the full screen of the second display 116d.

As shown in FIG. 4, operation begins at 410 where the control device 116 selects a portion on the first display 114d selected by a user. The first (main) display 114d can display images frame by frame generated from first image data (the source content) including at least one frame. In selecting the portion on the first display 114d, the user may activate the zoom-in function (such as by launching an associated application on control device 116, making a touch screen gesture and/or pressing a soft or actual key, for example) and points camera 116c of control device 116 at an area of interest (AOI) 350 on the first display. The order in which the zoom-in function is activated and the camera is pointed at the display 114d is interchangeable. A third image data is captured by camera 116c and indicates the selected portion on the first display 114d.

At step 420, a first portion in a frame in the first image data corresponding to the selected portion on the first display 114d is determined. This determining step can be performed by the AV delivery device 108. As discussed above, the AV delivery device 108 may determine the first portion in a frame in the first image data from the third image data indicating the selected portion on the first display 114d. In one embodiment, which is more suitable where the first image data represents a still image, the third image data represents a portion 350 of the image 310 on the first display 114d, and the AV delivery device 108 searches the first image data to find the first portion in a frame in the first image data corresponding to the image represented by the third image data. In another embodiment, which is suitable where the first image data represents either a still image or a moving image, the third image data includes a first portion representing an image of the first display 114d and the AV delivery device 108 determines the first portion in a frame in the first image data according to a relative position of the first portion of the third image data in the third image data and a size of the first portion of the third image data. For example, assuming a resolution of the first image data is A×B units and a resolution of the third image data is W×H units, the AV delivery device 108 may locate the first portion of the third image data and determine a position (p, q) in the third image data representing a center of the first portion of the third image data in the third image data; and determine a center of the first portion in a frame in the first image data as (a, b), where in $a=(A/W)*p$ and $b=(B/H)*q$. The position of the center in this illustration indicates the location of the first portion in a frame in the first image data. Also assuming the size of the first portion of the third image data includes a width of w units and a depth of h units, the AV delivery device 108 may determine a width and a depth of the first portion in a frame in the first image data respectively as d units and e units, wherein $d=(A/W)*w$ and $e=(B/H)*h$.

Once the first portion in a frame in the first image data has been determined, the AV delivery device 108 can generate second image data from the first image data corresponding to the first portion in a frame in the first image data at step 430. The AV delivery device 108 may generate the second image data by magnifying the first image data corresponding to the first portion in a frame in the first image data according to a magnification factor. The magnification factor may be automatically derived by the AV delivery device 108 using the width w and height h of the size of the first portion of the third image data. For example, the magnification factor is W/w to fill width of the second display 116d or H/h to fill the depth of the second display 116d. Assuming that the size of the first portion in a frame in the first image data is a×b units, the magnification factor can be automatically determined as W/a to fill the width of the second display 116d or H/b to fill the depth of the second display, as discussed previously. The display on the second display device 116d does not affect the display on the first display device 114d. For example, the second display device 116d may be displaying a portion of a first frame, which may be zoomed, but the first display device continues to display the full frame of the first frame. Thus, a user can view the full frame of the first frame on the first display device 114d and also see a zoom-in portion of the same frame on the second display device 116d.

Operation then loops back to step 410 as long as the zoom-in function is active. Preferably, the loop including steps 410-440 is repeated with sufficient frequency so that the display of the zoomed-in image on control device 116 is updated in real, or near real time as the user moves the camera. Preferably, AV delivery device 108 sends the second image data representing the zoomed-in video to control device 116 live. The location of area of interest 350, however, can be updated at some other rate that may lag behind. Thus, for example, the zoomed-in video can be displayed on control device 116 at 30-60 fps, whereas the rate at which control device 116 captures and transmits the third image data to AV delivery device 108 can be 5 fps or higher.

Figure 5:
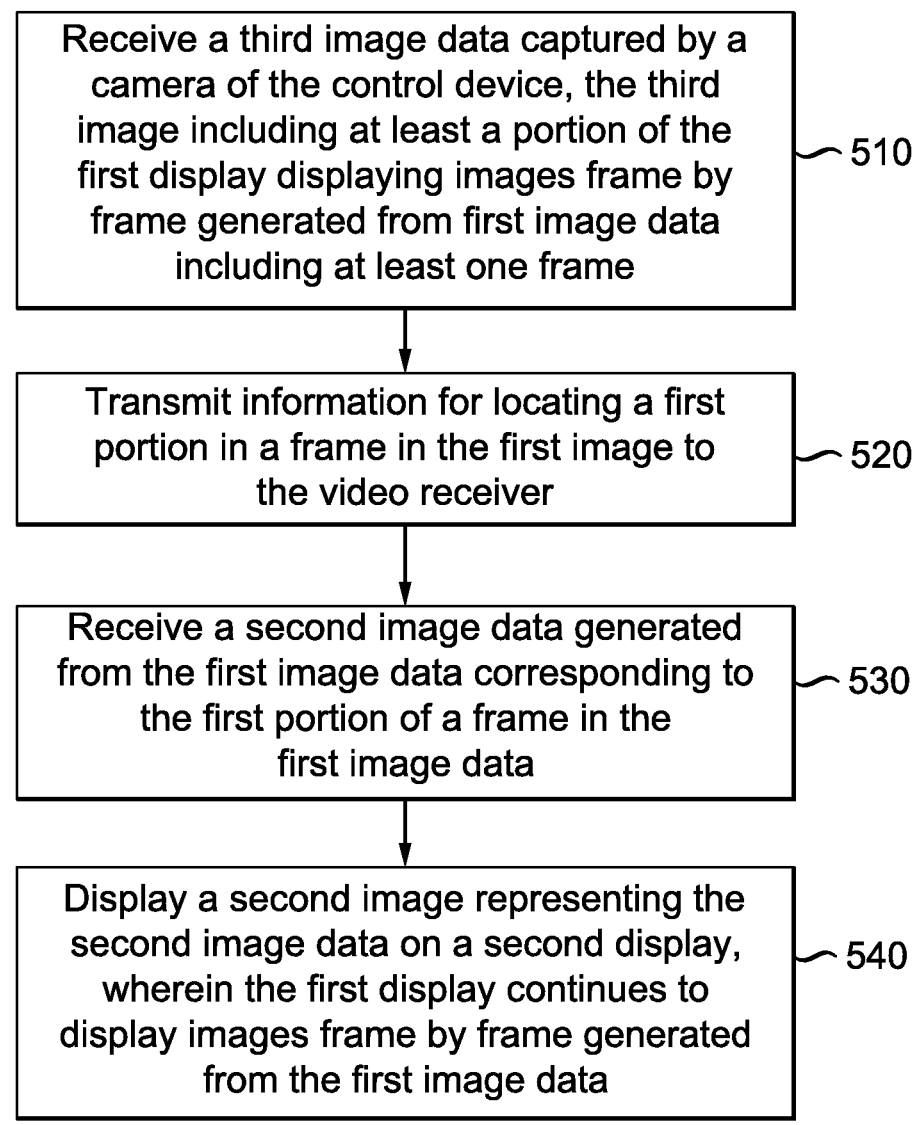
FIG. 5 is flowchart of an exemplary method performed by a control device in accordance with the principles of the present invention.

FIG. 5 illustrates operations that may be performed by the control device 116. At step 510, the control device 116 receives a third image data captured by a camera of the control device 116, the third image including at least a portion of the first display 114d displaying images frame by frame generated from first image data (source content) including at least one frame, wherein the third image is used to derive information of a first portion in a frame in the first image data corresponding to the area 350 selected by a user.

At step 520, the control device transmits information for locating the first portion in a frame in the first image to the AV delivery device 108. The information for locating the first portion in a frame in the first image can be the third image data itself, or if the third image data includes the entire display 114d in its first portion, it may include a size of the first portion of the third image data, and a location of the first portion of the third image data in the third image data. An advantage of not transmitting the third image data itself is to save the transmission bandwidth. The information may also include the resolution of the second display 116d in both embodiments. In the case that the full screen is not used in the second display 116d, the size of the area 350' should be also transmitted.

At step 530, the control device 116 receives a second image data generated from the first image data corresponding to the first portion in a frame in the first image data. The second image data may be a zoomed version of the first image data corresponding to the first portion in a frame in the first image data. At step 540, the control device 116 displays a second image generated from the second image data on a second display (116d), wherein the first display continues to display images frame by frame generated from the first image data.

Figure 6:
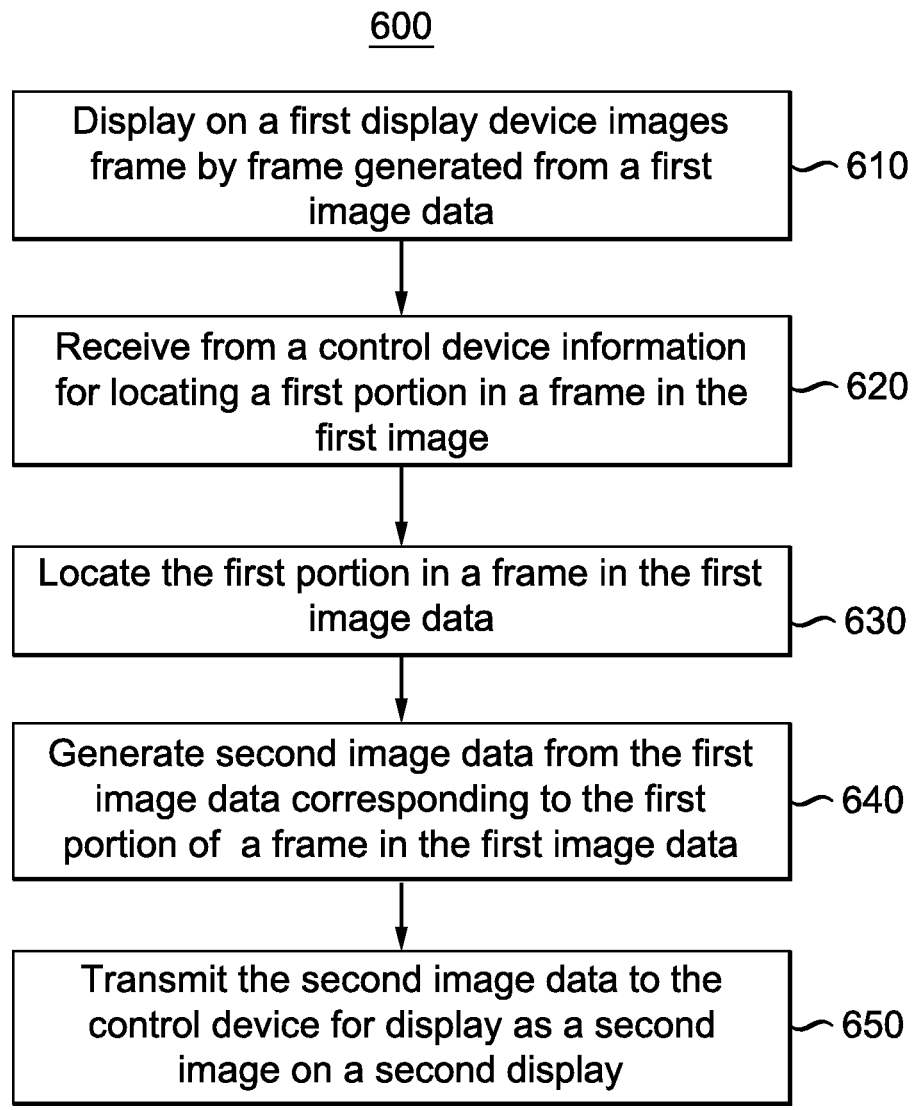
FIG. 6 is flowchart of an exemplary method performed by a video receiver in accordance with the principles of the present invention.

FIG. 6 illustrates the exemplary operations that can be performed at the AV delivery device 108. At step 610, the AV delivery device 108 displays on a first display device 114d images frame by frame generated from a first image data.

At step 620, the AV delivery device 108 receives from the control device 116 information for locating a first portion in a frame in the first image data. As discussed above with respect to FIG. 5, the control device may capture a third image data including at least a portion of the first display. The third mage data may include a portion of the image 310 displayed on the first display device 114d or include the entire display 114d. The information for locating the first portion in a frame in the first image data may be the third image data itself or the size and the relative location of the first device 114d in the third image data.

At step 630, the AV delivery device 108 locates the first portion in a frame in the first image data. In the scenario where the locating information is the third image data itself and the third image data includes a portion 350 of the image 316 displayed on the first display device 114, the AV delivery device 108 searches the first image data for the first portion corresponding to the third image data.

If the third image data includes a first portion represents an image of the first display 116d, the AV delivery device 108 determines the resolution W×H of the third image data, the size w×h of the first portion of the third image data, and a location of the first portion in the third image data. The location can be any predefined location, for example, the center location (p, q). Assuming the resolution of the first image data is A×B, the AV delivery device 108 determines the corresponding location of the first portion in a frame in the first image data as (a, b) using for example, Eqs. (1a), (1b), (2a), and (2b). For example, if Eqs. (2a) and (2b) are applied, a=(A/W)*p and b=(B/H)*q, and if Eqs. (1a) and (1b) are applied, a=(A/W)*(W−p) and b=(B/H)*(H−q). The width d and the depth e of the first portion in a frame in the first image data can be determined as d=(A/W)*w and e=(B/H)*h.

In the embodiment where the third image data includes a first portion representing an image of the entire first display 114d, the information for locating the first portion in a frame in the first image data may not be the third image data itself. Rather it includes the location (p, q) of the first portion in the third image, the size w×h of the first portion of the third image data, and the resolution W×H of the third image data. The AV delivery device 108 can locate the first portion in a frame in the first image data according to p, q, w, h, W, and H, as described above. Such an embodiment may be desirable, for example, for implementations in which the bandwidth of the wireless link from control device 116 to AV delivery device 108 cannot support the transmission of images captured by camera 116c and/or where AV delivery device 108 does not have sufficient processing power to search and locate AOI 350 within the images captured by camera 116c.

In further embodiments, control device 116 can preprocess the third image data captured by camera 116c before sending the third image data to AV delivery device 108, such as by compressing or simplifying the images, so as to reduce the aforementioned bandwidth requirement and/or processing burden on AV delivery device 108.

At step 640, the AV delivery device 108 generates second image data from the first image data corresponding to the first portion in a frame in the first image data. The second image data may be a zoomed version of the first image data corresponding to the first portion in a frame in the first image data. The magnification factor is stored in the storage 212 and used by the AV delivery device 108 for producing the second image data.

The AV delivery device 108 has a setting database stored in the storage 212 or in the memory 215. The settings are entered by a user using the user interface 222 or the control device 116. The settings may include a setting for magnification, the value of which can be automatic or a number indicating a magnification factor. Another setting may indicate the resolution W×H of the area 350', which may be the full screen of display 116*d*. In the automatic setting, the AV delivery device 108 calculates the magnification factor as W/w to fill the width of the area 350' or H/h to fill the depth of the area 350'. In the case that the resolution A×B of the first image data differs from the resolution W×H of the second display and the size of the first portion in a frame in the first image data is a×b, the AV delivery device 108 can also compute the magnification factor as W/a to fill the width of the area 350' or H/b to fill the depth of the area 350'.

At step 650, the AV delivery device 108 transmits the second image data to the control device for display as a second image on a second display 116*d*. As mentioned previously, the display on the second display device 116*d* does not affect the display on the first display device 114*d*. For example, the second display device 116*d* may be displaying a portion of a first frame, but the first display device continues to display the full frame of the first frame. Thus, a user can view the full frame of the first frame on the first display device 114*d* and also see a zoom-in portion of the same frame on the second display device 116*d*.

As mentioned previously, we assume that the size of area 350' covers full screen of the second display 116*d*. If the area 350' does not cover the full screen of the second display 116*d*, the size of the area 350' should be transmitted to the AV delivery device 108 for computing the magnification factor. As mentioned above, the control device 116 may further magnify or shrink the image displayed on the second display generated from the second image data by adjusting the size of the area 350'.

As mentioned, the resolution of the second image as it is to be displayed on display 116*d* is not limited by the resolution of display device 114 but rather is based on the resolution attainable from the content (the first image data) bearing signal as received or retrieved by AV delivery device 108. Thus for example, if AOI 350 represents 5% of the area of a 20 megapixel image, the resolution of the second image data as displayed on display 116*d*, i.e., area 350', corresponding to AOI 350 is preferably 1 mega pixels, even if the resolution of AOI 350 as displayed on a 720p television monitor is only 0.05 megapixels.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, some or all of the elements may be implemented in a stored-program-controlled processor, e.g., a digital signal processor or a general purpose processor, which executes associated software, e.g., corresponding to one, or more, steps, which software may be embodied in any of a variety of suitable storage media. Further, the principles of the invention are applicable to various types of devices and systems, including personal computing systems, among others. It is therefore to be understood that numerous modifications may be made to the illustrative embodiments and that other arrangements may be devised without departing from the spirit and scope of the present invention.

The invention claimed is:

1. A method comprising:
   receiving third image data captured from a camera of a control device; a first portion of the third image data representing an image of a first display displaying images frame by frame generated from first image data including at least one frame, wherein a resolution of said first image data is A×B units and a resolution of the third image data is W×H units;
   locating the first portion of the third image data;
   determining a position (p, q) in the third image data representing a center of the first portion of the third image data in the third image data;
   determining a center of a first portion in a frame in the first image data as (a, b), wherein $a=(A/W)*p$ and $b=(B/H)*q$; and
   generating second image data from the first image data corresponding to the first portion in a frame in the first image data; and providing the second image data to the control device for display as a second image on a second display.

2. The method of claim 1, wherein the size of the first portion of the third image data includes a width of w units and a depth of h units and the method further comprises determining a width and a depth of the first portion in a frame in the first image data respectively as d units and e units, wherein $d=(A/W)*w$ and $e=(B/H)*h$.

3. The method of claim 2, wherein the generating the second image data includes magnifying according to a magnification factor the first image data corresponding to the first portion in a frame in the first image data.

4. The method of claim 3, further comprising: determining the magnification factor from one of w and h.

5. The method of claim 4, wherein the magnification factor is equal to W/w.

6. The method of claim 4, wherein the magnification factor is equal to H/h.

7. The method of claim 1, wherein the first image data represents a still image or a video frame.

8. The method of claim 1, wherein the determining further comprises searching the first image data for a portion that corresponds to the third image data.

9. A video receiver comprising:
   a controller;
   a memory for storing first image data representing at least one frame, wherein the memory stores logic that when executed causes the controller to control the video receiver to perform at least the following:
   causes a first display to display images frame by frame represented by the first image data;
   receives third image data captured from a camera of a control device, a first portion of the third image data representing an image of the first display wherein a resolution of said first image data is A×B units and a resolution of the third image data is W×H units;
   locates the first portion of the third image data and determining a position (p, q) in the third image data representing a center of the first portion of the third image data;
   determines a center of a first portion in a frame in the first image data as (a, b), wherein $a=(A/W)*p$ and $b=(B/H)*q$; and
   generates second image data from the first image data corresponding to the first portion in a frame in the first image data; and provides the second image data to the control device for display as a second image on a second display.

10. The video receiver of claim 9, wherein the size of the first portion of the third image data includes a width of w units and a depth of h units, and the video receiver:

determines a width and a depth of the first portion in a frame in the first image data respectively as d units and e units, wherein d=(N)W*w and e=(B/H)*h.

11. The video receiver of claim 10, wherein the video receiver generates the second image data by zooming according to a magnification factor the first image data corresponding to the first portion in a frame in the first image data.

12. The video receiver of claim 11, wherein the video receiver determines the magnification factor from one of w and h.

13. The video receiver of claim 12, wherein the magnification factor is equal to W/w.

14. The video receiver of claim 12, wherein the magnification factor is equal to H/h.

15. The video receiver of claim 9, wherein the first image data represents a still image or a video frame.

16. A method used in a control device controlling a video receiver receiving first image data including at least one frame and displaying images frame by frame generated from the first image data on a first display, wherein a resolution of said first image data is A×B units, the method comprising:
receiving a third image data captured by a camera of the control device, the third image including at least a portion of the first display displaying images frame by frame generated from the first image data including at least one frame, wherein a resolution of the third image data is W×H units, a first portion of the third image data represents an image of the first display and the third image data is used to locate a first portion in a frame in the first image data selected by a user;
transmitting a size of the first portion of the third image data and the third image data to the video receiver, wherein the video receiver is configured to locate the first portion of the third image data and determine a position (p, q) in the third image data representing a center of the first portion of the third image data, determine a center of a first portion in a frame in the first image data as (a, b), wherein a=(A/W)*p and b=(B/H)*q, generate second image data from the first image data corresponding to the first portion in a frame in the first image data; and provide the second image data to the control device;
receiving the second image data; and
displaying a second image representing the second image data on a second display, wherein the first display continues to display images frame by frame generated from the first image data.

17. The method of claim 16, wherein the second image data represents a zoomed version of the first image data corresponding to the first portion in a frame in the first image data.

18. The method of claim 16, wherein the first image data represents a still image or a video frame.

19. A method comprising:
displaying on a first display device images frame by frame generated from a first image data, wherein a resolution of the first image data is A×B units;
receiving from control device a size of a first portion of third image data, which is w×h units and a location of a first portion of the third image data in the third image data, which is captured by a camera of the control device, the third image data including the first portion representing an image of the first display;
locating a first portion in a frame in the first image data by locating a center position of the first portion of the third image data, which is (p, q);
determining a resolution of the third image data, which is W×H units;
determining a center of the first portion in a frame in the first image data as (a, b), wherein a=(A/W)*p and b=(B/H)*q;
generating second image data from the first image data corresponding to the first portion in a frame in the first image data;
transmitting the second image data to the control device for display as a second image on a second display.

20. The method of claim 19, wherein the second image data represents a zoomed version of the first image data corresponding to the first portion in a frame in the first image data.

21. The method of claim 20, wherein the zoomed version is generated by magnifying the first portion in a frame in the first image data with a magnification factor.

22. The method of claim 21, wherein the magnification factor is stored in a memory.

23. The method of claim 19, further comprising determining a width and a depth of the first portion in a frame in the first image data respectively as d units and e units, wherein d=(A/W)*w and e=(B/H)*h.

24. The method of claim 23, wherein the magnification factor is determined according to said size.

25. The method of claim 24, wherein the magnification factor is calculated as W/w.

26. The method of claim 24, wherein the magnification factor is calculated as H/h.

27. The method of claim 19, wherein the first image data represents a still image or a video frame.

* * * * *